United States Patent Office 3,748,306
Patented July 24, 1973

3,748,306
PHOSPHORUS-CONTAINING THERMOPLASTIC
POLY(ETHER-SULFONES)
Ghazi Khattab, Parsippany, N.J., assignor to Allied
Chemical Corporation, New York, N.Y.
No Drawing. Filed Oct. 27, 1971, Ser. No. 193,187
Int. Cl. C08g 23/20, 33/16
U.S. Cl. 260—49                                           15 Claims

ABSTRACT OF THE DISCLOSURE

Phosphorus-containing thermoplastic poly(ether-sulfone) condensation polymers having a backbone chain of the formula $$\left[ -O-\underset{A_r}{\underset{|}{\bigcirc}}-\underset{R_2}{\overset{R_1}{\underset{|}{C}}}-\underset{A'_s}{\underset{|}{\bigcirc}}-O-\bigcirc-SO_2-\bigcirc- \right]_n$$

wherein $R_1$ and $R_2$ are H, alkyl or phenyl, provided only one of $R_1$ and $R_2$ is H, A and A' are members selected from the group consisting of $PCl_2$, $-PCl_4$, $-P(OX)_2$ and $-PO(OX)_2$ wherein X is H or an alkali metal, $n$ is an integer of at least 30, and $r$ and $s$ are 0 or 1, with the proviso that the ratio of $$\frac{r+s}{n}$$

is between 0.2 and 2, have improved resistance to attack by solvents and to environmental stress-cracking, as compared to the basic poly(ether-sulfone) from which they are prepared.

BACKGROUND OF THE INVENTION

Aromatic poly(ether-sulfone) condensation polymers having a backbone chain of the formula $$\left[ -O-\bigcirc-\underset{R_2}{\overset{R_1}{\underset{|}{C}}}-\bigcirc-O-\bigcirc-SO_2-\bigcirc- \right]_n \quad (I)$$

wherein $R_1$ and $R_2$ are hydrogen, alkyl or aryl radicals are known products. [Cf., e.g., R. N. Johnson et al., Poly (Aryl Ethers) by Nucleophilic Aromatic Substitution, Journal of Polymer Science, Part A-1, vol. 5, p. 2375 (1967).] These polymers are characterized by excellent thermal stability and chemical inertness. Aromatic poly ether-sulfones) of the above formula wherein $R_1$ and $R_2$ are both methyl groups and wherein $n$ has values between about 50 and 80 are commercially available products. They are clear, rigid, tough thermoplastics with glass transition temperatures of 180 to 250° C. That high glass transition temperature in combination with excellent thermal stability and chemical inertness makes possible continuous use of products made therefrom at temperatures in the range of 150 to 200° C. Although their melting temperatures are high, their good thermal stability allows fabrication by usual thermoplastic processing operations to obtain fabricated articles. Such articles, unfortunately, are subject to attack by polar organic solvents such as ketones, chlorinated hydrocarbons and aromatic hydrocarbons which, if they fail to dissolve them, cause cracking under stress.

It is an object of the present invention to so modify aromatic poly(ether-sulfones) of Formula I above, to increase their resistance to attack by solvents.

It is another object of the present invention to so modify these aromatic poly(ether-sulfones) to increase their resistance to environmental stress-cracking when contacted with solvents.

It is a further object to provide aromatic poly(ether-sulfone) resins combining high thermal stability, chemical inertness, resistance to attack by solvents and resistance to environmental stress-cracking.

SUMMARY OF THE INVENTION

In accordance with the present invention, there are provided phosphorus-containing aromatic poly(ether-sulfone) condensation products of diphenyl sulfone and a bisphenol of the formula $$HO-\bigcirc-\underset{R_2}{\overset{R_1}{\underset{|}{C}}}-\bigcirc-OH \quad (II)$$

wherein $R_1$ and $R_2$, which may be the same or different, are selected from the group consisting of H, alkyl, straight chain or branched, having from 1 to 12 carbon atoms, phenyl and alkyl-substituted phenyl, with the proviso that only one of $R_1$ and $R_2$ may be H, such condensation products having a backbone chain of the formula $$\left[ -O-\underset{A_r}{\underset{|}{\bigcirc}}-\underset{R_2}{\overset{R_1}{\underset{|}{C}}}-\underset{A'_s}{\underset{|}{\bigcirc}}-O-\bigcirc-SO_2-\bigcirc- \right]_n \quad (III)$$

wherein $R_1$ and $R_2$ have the afore-stated meanings, A and A' are members selected from the group consisting of $PCl_2$, $-PCl_4$, $-P(OX)_2$ and $-PO(OX)_2$ wherein X is H or an alkali metal, $n$ is an integer of at least about 30 and $r$ and $s$ are 0 or 1, with the proviso that the ratio of $$\frac{r+s}{n}$$

is between 0.2 and 2.

The aromatic phosphorus-containing poly(ether-sulfone) products of Formula III, above, wherein A and A' are $-P(OH)_2$ may be obtained by treating an aromatic poly(ether-sulfone) condensation polymer having the Formula I, above, wherein $R_1$ and $R_2$ have the afore-stated meanings, with phosphorous trichloride in the presence of aluminum trichloride under anhydrous conditions at elevated temperature to form the halophosphine adduct, followed by hydrolysis of the halophosphine adduct to form the phosphonous acid:

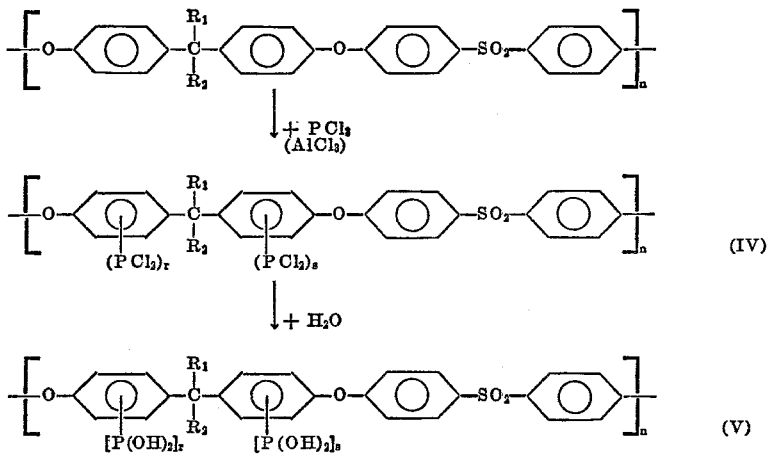

wherefrom the corresponding alkali metal salts (invention products of Formula III, above, wherein A and A' are —P(OX)$_2$ wherein X is an alkali metal) are readily obtained by treatment with an alkali metal hydroxide.

The aromatic phosphorus-containing poly(ether-sulfone) products of Formula III, above, wherein A and A' are —PO(OH)$_2$ (phosphonic acids) may be prepared from the phosphorous acids of Formula V, above, by treatment with suitable oxidizing agents, such as bichromate, hydrogen peroxide, or, preferably, nitric acid. The phosphonic acids thus obtained are readily converted to the corresponding alkali metal salts (invention products of Formula III, above, wherein A and A' are —PO(OX)$_2$ wherein X is an alkali metal) by treatment with an alkali metal hydroxide.

Aromatic phosphorus-containing poly(ether-sulfone) products of Formula III, above, wherein A and A' are —PO(OH)$_2$ (phosphonic acids) may also be prepared by treatment of halophosphine adducts of Formula IV, above, with elemental chlorine to form the tetrachlorophosphine adduct, followed by hydrolysis thereof to form the free phosphonic acids:

The aromatic poly(ether-sulfone) condensation polymers furnishing the starting material for making the phosphorus-containing polymer products of the present invention may be obtained by solution condensation polymerization of alkali metal salt of dihydric phenol of Formula II, above, with 4,4'-dihalodiphenyl sulfone in an anhydrous, dipolar aprotic solvent, preferably dimethyl sulfoxide or tetrahydrothiophene 1,1-dioxide at elevated temperatures, as described by Johnson et al. in the above cited reference. A typical aromatic poly(ether-sulfone) starting material having the formula

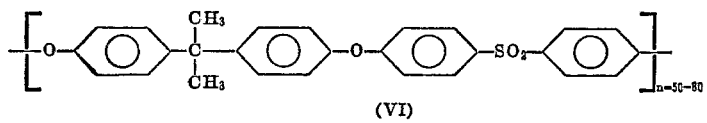

is commerically available.

The bisphenols of Formula II, above, which are required as a starting material for making the polymers of Formula I, above, are obtained by condensation of the corresponding ketone or aldehyde with phenol under acidic conditions in known manner.

Reaction of the aromatic poly(ether-sulfone) condensation polymer of Formula I, above, with phosphorous trichloride in the presence of aluminum trichloride is a typical Friedel-Crafts reaction. It must be carried out under anhydrous conditions, under exclusion of air, and, since the starting polymer is a solid, it is preferably carried out in solution in a suitable inert solvent, such as, typically sym. tetrachloroethane, chloroform, methylene

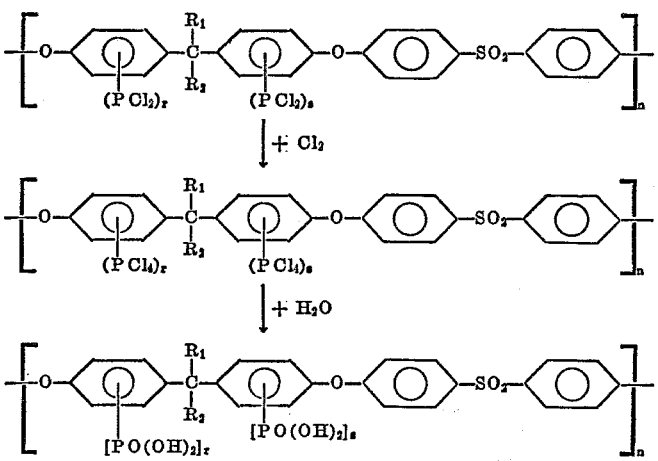

chloride, carbon disulfide, petroleum ether, nitrobenzene, and the like. This reaction is suitably conducted at reflux temperature of the reaction mixture, using the phosphorous trichloride reagent in amount from about 5 mol percent to about 500 mol percent, preferably in amount from about 10 mol percent to about 50 mol percent, based on the mols of phenylene rings derived from the bisphenol of Formula II, above. The aluminum trichloride catalyst is suitably employed in amount from about 5 mol percent to about 100 mol percent, preferably in amount from about 10 mol percent to about 50 mol percent, based on the mols of phenylene rings derived from the bisphenol of Formula II, above. Use of aluminum trichloride catalyst in about equimolar amount, based on the mols of phenylene rings derived from the bisphenol of Formula II, above is especially preferred. Reaction times at reflux temperature may typically vary from about 1 hour to about 10 hours. This reaction may, if desired, be carried out in the absence of solvent, preferably employing the aromatic poly(ether-sulfone) starting polymer in finely divided form, using excess phosphorous trichloride as liquid reaction medium.

In the above-described procedure, the phosphorous trichloride attacks substantially only the aromatic rings adjacent to the —($R_1$)($R_2$)C— groups derived from the bisphenol of Formula II, above, without significant attack on the aromatic rings derived from the diphenyl sulfone.

Hydrolysis of the dihalophosphine adduct to form the free phosphorous acid of Formula V, above, proceeds readily upon addition of water to the dihalophosphine adduct. Neutralization of the phosphorous acid to form its alkali metal salt is readily accomplished by contacting it with aqueous alkali metal hydroxide, suitably in excess of stoichiometrically required amount.

The phosphorous acid products, as well as their alkali metal salts, may, if desired, be purified using conventional methods, such as washing with water, especially hot water, or with methanol. Another suitable procedure involves dissolving them in a suitable solvent, as for example, dimethyl sulfoxide, followed by precipitation or crystallization. This latter method, though, is of somewhat limited use because of the low solubility of the products.

Oxidation of the phosphonous acid product to the phosphonic acid product is conveniently accomplished by contacting it with nitric acid, for example, 2 N nitric acid, preferably at elevated temperature, say about 100° C. for a period of time sufficient to allow substantial completion of the oxidation, say from about 0.5 to 10 hours.

Neutralization of the phosphonic acid to form the alkali metal phosphonate proceeds readily in the manner above described for neutralization of the phosphorous acid.

Chlorination of the dihalophosphine adduct of Formula IV, above, to form the tetrachlorophosphine adduct is suitably conducted in solution in a suitable solvent, such as tetrachloroethane, at ambient temperature, by merely bubbling chlorine gas through the solution until absorption of chlorine ceases. Hydrolysis of the tetrachlorophosphine product to form the free phosphonic acid, and neutralization thereof, with alkali metal hydroxide follows above-described procedures for hydrolysis of the dichlorophosphine adduct and neutralization of the hydrolysis product.

Environmental stress-cracking, as used herein and as conventionally understood, refers to macroscopic internal or external cracks caused by tensile stresses less than the short time mechanical strength of the polymer when it is subjected to the presence of organic solvents wherein ordinarily, but not necessarily, the polymer itself is insoluble. Thus, it may be a purely physical occurrence involving no chemical degradation or alteration of the polymer, but it may also involve some swelling or softening thereof.

DESCRIPTION OF PREFERRED EMBODIMENTS

With respect to the aromatic poly(ether-sulfone) condensation polymers of Formula I, above, which furnish the starting material for the products of the present invention, those are preferred embodiments wherein $R_1$ and $R_2$ are both alkyl groups, and more preferred yet are those wherein $R_1$ and $R_2$ are both alkyl groups, straight chain or branched having from 1 to 6 carbon atoms. An aromatic poly(ether-sulfone) of Formula I, above, wherein $R_1$ and $R_2$ are both methyl groups, is a specific example of a preferred starting polymer.

Further with respect to the poly(ether-sulfone) of Formula I, above, $n$ is suitably an integer of from about 30 to about 900, preferably from about 50 to about 100.

Since modification of the starting polymers, in accordance with the method of the present invention, does not involve any modifications of the starting polymer with respect to $R_1$, $R_2$ and $n$, the above remarks concerning preferred embodiments thereof fully comply to the polymer products of the present invention of Formula III, above.

With respect to the phosphorus-containing aromatic poly(ether-sulfone) condensation products of the present invention having a backbone chain of Formula III, above, those wherein substituents A and A' are —P(OX)$_2$ or —PO(OX)$_2$ wherein X is an alkali metal, and especially those wherein X is sodium or potassium, are preferred. These represent the alkali metal salts of the phosphorous or phosphoric acid. While the corresponding free acids do have substantially improved resistance to attack by solvents and to environmental stress-cracking, as compared to the starting polymer wherefrom they are prepared, their heat stability, in some instances, is lower than that of the corresponding starting polymer, although not so low as to severely limit their usefulness. The corresponding alkali metal salts, however, do have the improved resistance to attack by solvents and resistance to environmental stress-cracking in addition to possessing all of the advantageous properties of the starting polymers wherefrom they are prepared, including their thermal stability, good electrical property, tensile strength and elongation.

With further reference to Formula III, above, the ratio of $$\frac{r+s}{n}$$

in preferred embodiment ranges from about 0.2 to about 2.0. In the event that the ratio of $$\frac{r+s}{n}$$

is below about 0.2, the polymer products, though possessing all of the advantageous properties of the starting polymer, do not have substantially improved resistance to attack by solvents and resistance to environmental stress-cracking.

The following examples illustrate the further embodiments of the present invention and set forth the best mode contemplated for its practice.

EXAMPLE 1

A three-necked, one-liter reaction flask equipped with thermometer, stirrer, condenser and CaCl$_2$ drying tube is flamed under argon purge and cooled to room temperature in a stream of argon. 44 grams (0.10 mol) of thoroughly dried poly(ether-sulfone) composed of recurring units of Formula I, above, are introduced into the flask, followed by 400 cc. of sym. tetrachloroethane which had and any excess PCl$_3$ is distilled are then carefully poured previously been distilled from calcium hydride. 27.5 grams (0.2 gm. mol) of reagent-grade phosphorous trichloride are added followed by 26.7 grams (0.2 gm. mol) of anhydrous aluminum chloride. The mixture is heated with stirring at 75° C. for a period of 6 hours. At the end of this reaction time, the condenser is replaced with a distilling head, the reaction mass cooled to about 35° C. and any excess PCl$_3$ is distilled off at 21° C. 100 mm. Hg vacuum. The contents of the reactor are then carefully poured into one liter of water containing some crushed ice. The polymer is filtered, washed several times with water, then stirred in one liter of 4 N HCl for 30 minutes at 80°–100° C. It is filtered again, washed well with water and finally washed with methanol, filtered under suction and dried in a vacuum oven at 100° C./10 mm. Hg vacuum to obtain a polymer product of Formula III, above, wherein A and A' are phosphonous acid groups represented by the structure —P(OH)$_2$.

EXAMPLE 2

The dry product obtained in Example 1 is charged into a one-liter, three-necked flask fitted with stirrer, thermometer and condenser and 500 cc. of 2 N nitric acid are introduced. The mixture is heated with stirring at 95° C. for 2 hours, then cooled to room temperature and filtered through a large sintered glass filter. It is washed several times with water, then washed with methanol and dried at 100° C./10 mm. Hg vacuum to obtain a polymer product of Formula III, above, wherein A and A' are phosphonic acid groups represented by the structure

—P(O)(OH)$_2$

EXAMPLE 3

A three-necked, one-liter reaction flask equipped with thermometer, stirrer, condenser and CaCl$_2$ drying tube is flamed and cooled under argon. 44 grams (0.10 mol) of thoroughly dried poly(ether-sulfone) composed of recurring units of Formula I, above, are introduced into the flask, followed by 400 cc. of sym. tetrachloroethane which had previously been distilled from calcium hydride. 27.5 grams (0.20 gm. mol) of reagent-grade phosphorous trichloride are added followed by 26.7 grams (0.20 gm. mol) of anhydrous aluminum chloride. The mixture is heated with stirring at 75° C. for a period of 6 hours. Then the condenser is replaced with a distilling head, the reaction mass cooled to about 35° C. and any excess PCl$_3$ distilled off at 21° C./100 mm. Hg vacuum. The distillation head is then replaced with a gas inlet tube connected to a supply of chlorine gas. Chlorine is bubbled into the solution at 35° C. until no more chlorine is absorbed. The reaction is allowed to proceed for 2 more hours. Excess methanol is then added to dissolve the solvent and precipitate out polymer dissolved in the solvent and the mixture filtered and washed with water. The product is then hydrolyzed by stirring in one liter of 4 N HCl for 30 minutes at 80°–100° C. It is filtered again, washed well with water and finally washed with methanol and dried at 100° C./10 mm. Hg vacuum to obtain a polymer product of Formula III, above, wherein A and A' are phosphonic acid groups represented by the structure —P(O)(OH)$_2$.

EXAMPLE 4

25 grams of product obtained in Example 1 above are stirred in 500 cc. of 2 N sodium hydroxide solution at 90°–100° C. for 1 hour, cooled to room temperature and filtered. The precipitate is washed with excess water and finally washed with methanol and dried at 100° C./10 mm. Hg vacuum to obtain product of Formula III, above, wherein A and A' are the sodium salt of the phosphonous acid as represented by the structure —P(ONa)$_2$.

EXAMPLE 5

25 grams of product obtained in Example 2 or 3 are stirred in 500 cc. of 2 N sodium hydroxide solution at 90°–100° C. for 1 hour and cooled to room temperature and filtered. The precipitate is washed with excess water, then with methanol and dried at 100° C./10 mm. Hg vacuum to obtain product of Formula III, above, wherein A and A' are the sodium salt of the phosphonic acid as represented by the structure —P(O)(ONa)$_2$.

EXAMPLE 6

A three-necked, 500 cc. flask equipped with thermometer, stirrer, condenser and CaCl$_2$ drying tube is flamed and cooled under argon purge. 44 grams (0.10 gm. mol) of dry poly(ethersulfone) are introduced followed by 150 cc. (about 1.70 gm. mols) of PCl$_3$ and 26.7 grams (0.20 gm. mol) of anhydrous aluminum chloride. The mixture is refluxed for 6 hours, excess PCl$_3$ distilled off and 300 cc. ice-water mixture poured into the reaction flask and stirred well. The mixture is filtered, washed well with water and stirred with one liter of 4 N HCl at 80°–100° C. It is then filtered, washed with water and methanol and dried to obtain a polymer product of Formula III, above, wherein A and A' are —P(OH)$_2$.

When other poly(ether-sulfones) having backbone chains comprised of recurring units according to Formula I, above, are converted into phosphorus-containing polymers in accordance with the present invention, similar results are obtained, that is to say, phosphorus-containing thermoplastic poly(ethersulfones) according to Formula III, above, are formed having improved resistance to attack by solvents, and improved resistance to environmental stress-cracking, as compared to the poly(ether-sulfone) wherefrom they are obtained.

The improved products of the present invention can be fabricated using methods conventionally employed for forming thermoplastic materials such as extrusion, injection molding, blow molding and thermoforming. Products made therefrom are eminently suitable for applications where their unusual combination of properties, namely, strength at high temperatures, resistance to chemical attack, especially to attack by solvents, and resistance to environmental stress-cracking, combined with good electrical insulating properties, may be employed to advantage. Illustrative applications include films, sheets, solid molded objects and coatings. The products of the present invention are especially suitable for making mounting boards for electric and electronic assemblies, electrical insulators and the like, especially if intended for use in high temperature environments. The excellent properties of the invention products may, for certain purposes, if desired, be improved by incorporating therein inert fillers such as asbestos, glass, metal powders, diamond powder, abrasive powders, graphite, and the like. Such filler generally may be incorporated for the purpose of improving such properties as stiffness, thermal conductivity, electrical insulating properties and hardness.

Since various changes and modifications may be made in the invention without departing from the spirit and essential characteristics thereof, it is intended that all matter contained in the above description shall be interpreted as illustrative only, the invention being limited only by the scope of the appended claims.

I claim:
1. Phosphorus-containing aromatic poly(ethersulfone) condensation polymer composed of recurring units of the formula

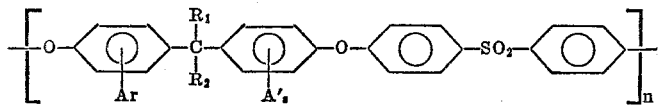

wherein R$_1$ and R$_2$, which may be the same or different, are selected from the group consisting of H, alkyl, straight chain or branched, having from 1 to 12 carbon atoms, phenyl and alkyl-substituted phenyl, with the proviso that only one of R$_1$ and R$_2$ may be H, A and A' are members selected from the group consisting of —PCl$_2$, —PCl$_4$, —P(OX)$_2$ and —PO(OX)$_2$ wherein X is H or an alkali metal, $n$ is an integer of at least about 30, and $r$ and $s$ are 0 or 1, with the proviso that the ratio of $$\frac{r+s}{n}$$

is between 0.2 and 2.

2. Condensation polymer according to claim 1 wherein A and A' are both —P(OX)₂ wherein X is an alkali metal.

3. Condensation polymer according to claim 2 wherein R₁ and R₂ are both alkyl, straight chain or branched, having from 1 to 12 carbon atoms.

4. Condensation polymer according to claim 2 wherein R₁ and R₂ are both alkyl groups, straight chain or branched, having from 1 to 6 carbon atoms.

5. Condensation polymer according to claim 2 wherein $n$ is an integer of from 30 to 900.

6. Condensation polymer according to claim 1 wherein R₁ and R₂ are both methyl groups, $n$ is an integer of from 50 to 100, A and A' are both —P(OX)₂ wherein X is sodium or potassium.

7. Condensation polymer according to claim 1 wherein

A and A' are both —PO(OX)₂ wherein X is an alkali metal.

8. Condensation polymer according to claim 7 wherein R₁ and R₂ are both alkyl, straight chain or branched, having from 1 to 12 carbon atoms.

9. Condensation polymer according to claim 7 wherein R₁ and R₂ are both alkyl, straight chain or branched, having from 1 to 6 carbon atoms.

10. Condensation polymer according to claim 7 wherein $n$ is an integer of from 30 to 900.

11. Condensation polymer according to claim 1 wherein R₁ and R₂ are both methyl groups, $n$ is an integer of from 50 to 100, A and A' are both —PO(OX)₂ wherein X is sodium or potassium.

12. The method for making condensation polymer according to claim 1 which comprises contacting an aromatic poly(ether-sulfone) condensation polymer composed of recurring units of the formula

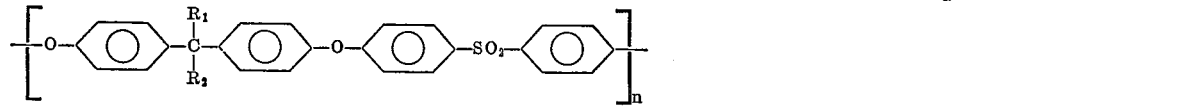

wherein R₁, R₂, which may be the same or different, are selected from the group consisting of H, alkyl, straight chain or branched, having from 1 to 12 carbon atoms, phenyl and alkyl-substituted phenyl, with the proviso that only one of R₁ and R₂ may be H, and $n$ is an integer of at least about 30, with phosphorous trichloride in the presence of aluminum trichloride under anhydrous conditions at elevated temperature to form a halophosphine adduct, and hydrolyzing the halophosphine adduct.

13. The method for making condensation polymer according to claim 2 composed of recurring units of the formula

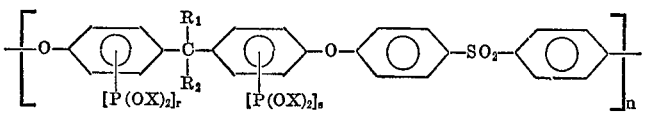

wherein X is an alkali metal, R₁ and R₂, which may be the same or different, are selected from the group consisting of H, alkyl, straight chain or branched, having from 1 to 12 carbon atoms, phenyl and alkyl-substituted phenyl, with the proviso that only one of R₁ and R₂ may be H, $n$ is an integer of at least about 30, $r$ and $s$ are 0 or 1, with the proviso that the ratio of $$\frac{r+s}{n}$$

is between 0.2 and 2, which comprises contacting a phosphorus-containing aromatic poly(ether-sulfone) condensation polymer composed of recurring units of the formula

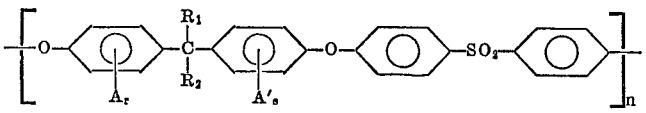

wherein A and A' are both —P(OX)₂, wherein X is H, and wherein R₁, R₂, $n$, $r$ and $s$ have the afore-stated meanings, with an alkali metal hydroxide.

14. The method for making condensation polymer according to claim 1 composed of recurring units of the formula

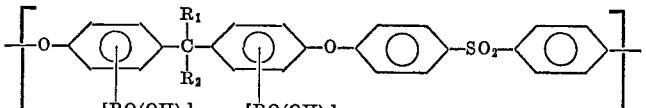

wherein R₁ and R₂, which may be the same or different, are selected from the group consisting of H, alkyl, straight chain or branched, having from 1 to 12 carbon atoms, phenyl and alkyl-substituted phenyl, with the proviso that only one of R₁ and R₂ may be H, $n$ is an integer of at least about 30, $r$ and $s$ are 0 or 1, with the proviso that the ratio of $$\frac{r+s}{n}$$

is between 0.2 and 2, which comprises contacting an aromatic poly(ether-sulfone) condensation polymer composed of recurring units of the formula

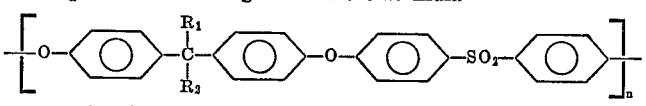

wherein R₁, R₂ and $n$ have the afore-stated meanings, with phosphorous trichloride in the presence of aluminum trichloride under anhydrous conditions at elevated temperature to form a halophosphine adduct, contacting said halophosphine adduct with elemental chlorine to form a tetrachlorophosphine adduct composed of recurring units of the formula

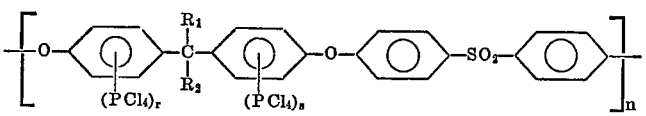

wherein R₁, R₂, $r$, $s$ and $n$ have the afore-stated meanings, and hydrolyzing said tetrachlorophosphine adduct.

15. The method for making condensation polymer according to claim 7 composed of recurring units of the formula

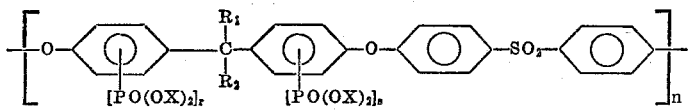

wherein X is an alkali metal, $R_1$ and $R_2$, which may be the same or different, are selected from the group consisting of H, alkyl, straight chain or branched, having from 1 to 12 carbon atoms, phenyl and alkyl-substituted phenyl, with the proviso that only one of $R_1$ and $R_2$ may be H, $n$ is an integer of at least about 30, $r$ and $s$ are 0 or 1, with the proviso that the ratio of $$\frac{r+s}{n}$$

is between 0.2 and 2, which comprises contacting a phosphorus containing aromatic poly(ether-sulfone) condensation polymer composed of recurring units of the formula

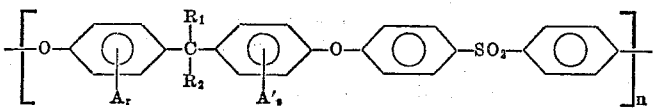

wherein A and A' are both $-PO(OX)_2$ wherein X is H, and wherein $R_1$, $R_2$, $n$, $r$ and $s$ have the afore-stated meanings, with an alkali metal hydroxide.

References Cited

UNITED STATES PATENTS

| | | | |
|---|---|---|---|
| 3,332,909 | 7/1967 | Farnham et al. | 260—47 |
| 3,635,809 | 1/1972 | Takemura et al. | 260—47 |

WILLIAM H. SHORT, Primary Examiner

L. L. LEE, Assistant Examiner

U.S. Cl. X.R.

117—161 UE; 260—30.8 R, 30.8 DS, 32.4, 33.2 R, 33.8 R, 37 M, 37 R, 47 P